United States Patent [19]
Tomita et al.

[11] 3,757,884
[45] Sept. 11, 1973

[54] APPARATUS FOR SUPPORTING THE GEAR SHIFT LEVER FOR OPERATING THE TRANSMISSION OF A MOTORCAR

[75] Inventors: Takao Tomita, Wako; Masayoshi Uesugi, Sayama, both of Japan

[73] Assignee: Honda Giken Kogyo Kabushiki Kaisha, Tokyo, Japan

[22] Filed: Dec. 29, 1971

[21] Appl. No.: 213,403

[30] Foreign Application Priority Data
Dec. 31, 1970  Japan.............................. 45/123273

[52] U.S. Cl................................. 180/77 R, 74/490
[51] Int. Cl............................................. B60k 17/00
[58] Field of Search............... 180/70 P, 70 R, 64 R, 180/54 E, 54 F, 77 R; 74/490, 473 R

[56] References Cited
UNITED STATES PATENTS
2,758,662   8/1956   Peras............................... 180/70 R
2,328,141   8/1943   Haltenberger.................... 180/70 R
3,323,609   6/1967   Rosenberger et al............. 74/473 R
3,645,145   2/1972   Galas............................... 74/473 R

*Primary Examiner*—Gerald M. Forlenza
*Assistant Examiner*—Richard A. Bertsch
*Attorney*—Eric H. Waters, John G. Schwartz et al.

[57] ABSTRACT

Apparatus for supporting a gear shift lever for operating a transmission in a motorcar wherein a connecting rod is attached to a projecting control rod of the transmission for pivotable movement about a horizontal axis which is coincident with the axis of pivotal movement of a frame connected to the internal combustion engine. The frame supports the gear shift lever in a spherical bearing and the gear shift lever is operatively connected to the connecting rod. The frame is resiliently supported at its rear end by the car body and the engine is mounted on its own resilient supports on the car body.

10 Claims, 2 Drawing Figures

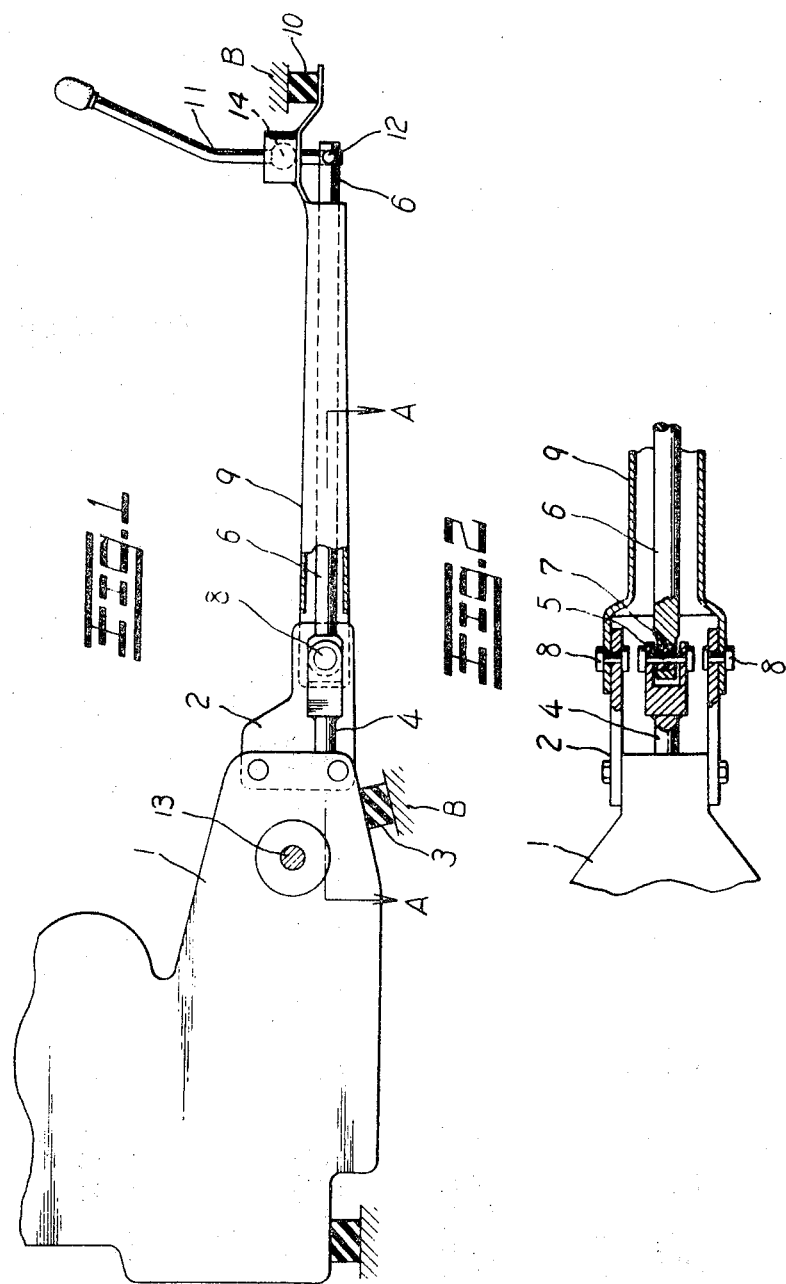

ns3,757,884

APPARATUS FOR SUPPORTING THE GEAR SHIFT LEVER FOR OPERATING THE TRANSMISSION OF A MOTORCAR

BACKGROUND OF THE INVENTION a. Field of the Invention

This invention relates to apparatus for the support of a gear shift lever operating a transmission in a motorcar.

b. Prior Art

A conventional motorcar has the general deficiency that when the internal combustion engine is resiliently supported on the car body and is moved up and down or back and forth or in inclined fashion in relation to the car body either by vibrations caused by its own operation, acceleration or deceleration during driving, or the condition of the road surface or the like, this movement is transmitted through the transmission to the gear shift lever supported directly on the car body. Consequently the gear shift lever is moved back and forth in relation to the car body and may cause disengagement of the meshed gears in the transmission.

SUMMARY OF THE INVENTION

An object of the invention is to provide apparatus for the support of the gear shift lever of the transmission such that unnecessary movement of the gear shift lever caused by vibration and the like of the internal combustion engine is diminished to a minimum.

To satisfy the above and other objects and to obviate the deficiency of the conventional apparatus, this invention contemplates a construction comprising a supporting frame extending from the internal combustion engine and supporting the gear shift, lever and a connecting rod connected to a control rod of a transmission and operatively connected to the gear shift lever, the frame and connecting rod being respectively swingable from the engine and control rod about a common horizontal axis so that unfavorable movement of the gear shift lever is minimized.

BRIEF DESCRIPTION OF THE DRAWING

FIG. 1 is a side view, partly in section of the apparatus according to this invention; and FIG. 2 is a sectional view taken along line II—II in FIG. 1.

DETAILED DESCRIPTION

Referring to the drawing, therein is diagrammatically shown an internal combustion engine 1 which is supported from a car body B through resilient support members 3. A support structure 2 is fixedly connected to the rear end of the engine. A control rod 4 of a transmission combined with the engine projects rearward from the rear portion of the engine 1, and a horizontal connecting pin 5 pivotally attaches the rear end of the control rod 4 to the front of a rearwardly extending connecting rod 6 through a shock absorbing member 7 so that the rod 6 is pivotally movable up and down about pin 5. Additionally, a supporting frame 9 is mounted at the rear of the support structure 2 by connecting pins 8 such that the supporting frame 9 is pivotally movable up and down about pins 8. The connecting pins 8 are disposed at the same horizontal level as pin 5 and are aligned along a common horizontal axis therewith. The supporting frame 9 surrounds the rod 6 and extends rearwards parallel therewith, and the rear end of frame 9 is suspended from the car body B through a resilient supporting member 10. A gear shift lever 11 is supported at the rear portion of the supporting frame 9 through a spherical bearing 14, and the rear end of the rod 6 is pivotally connected at 12 to the lower end of the gear shift lever 11. Numeral 13 denotes a driving shaft for the front wheels.

The engine 1 and the supporting frame 9 on the one hand, and the control rod 4 and the connecting rod 6 on the other hand are respectively connected at their respective connections on the same horizontal axis while the rear end of the supporting frame 9 is resiliently supported at 10 from the car body B, so that if the engine 1 vibrates up and down or in inclined relation with respect to the car body B, the supporting frame 9 is permitted to swing up and down about the resilient supporting member 10, and accordingly the gear shift lever 11 supported near the center of swinging movement of the member 10 undergoes very small movement. Additionally, the supporting frame 9 and the rod 6 are arranged to be pivoted at their front ends on the same horizontal axis so that when these are swung up and down, no relative movement occurs therebetween, and accordingly no unnecessary or unfavorable movement of the gear shift lever 11 is produced.

Additionally, if the engine 1 is moved back and forth in relation to the car body B, the connecting rod 6 and the supporting frame 9 are moved back and forth as a unit, and at the same time, this movement can be absorbed by the resilient supporting member 10. Unnecessary movement of the rod 6 is not produced in this case either.

According to this invention, even when the engine is moved up and down or back and forth or in inclined fashion in relation to the car body B, the connecting rod 6 and the supporting frame 9 are always moved as one unit, so that the gear shift lever 11 is not moved unnecessarily in relation to the connecting rod 6 and the supporting frame 9 and thus disengagement of the meshed gears in the transmission caused by unnecessary movement of the gear shift lever 11 can be prevented. Additionally, the swinging movement of the supporting frame 9 is small at its rear portion, so that swinging movement of the gear shift lever 11 is diminished.

From the above, it is seen that the invention provides means constituted by the pins 5 and 8, to support the connecting rod 6 and frame 9 respectively for pivotal movement about a common horizontal axis, the rod 6 being operatively connected at its remote end to the lever 11 while the frame 9 supports the lever 11 in spherical bearing 14 at a location above the pin 12.

What is claimed is:

1. In a motorcar having an internal combustion engine combined with a transmission having a projecting control rod, an improvement comprising a gear shift lever, a connecting rod operatively coupled to said gear shift lever, a frame supporting said gear shift lever, and means connecting said connecting rod to the control rod and the frame to the engine for respective pivotal movement about a common horizontal axis.

2. An improvement as claimed in claim 1 comprising resilient supports for said engine from the body of the motorcar, and a further resilient support for the frame from the body.

3. An improvement as claimed in claim 2 wherein the resilient support for said frame is proximate the support location of the gear shift lever on the frame, and remote from said horizontal axis.

4. An improvement as claimed in claim 1 comprising a support structure fixed to the engine, said means comprising a first pivot means connecting the frame from said support structure and a second pivot means connecting the connecting rod and said control rod.

5. An improvement as claimed in claim 4 wherein said first and second pivot means comprises respective pins disposed horizontally and in axial alignment.

6. An improvement as claimed in claim 5 comprising a shock absorbing member between said control rod and connecting rod.

7. An improvement as claimed in claim 5 comprising a spherical bearing supporting the gear shift lever from said frame.

8. An improvement as claimed in claim 7 comprising a pivot connecting said gear shift lever and connecting rod.

9. An improvement as claimed in claim 5 wherein said frame surrounds said connecting rod.

10. An improvement as claimed in claim 5 wherein said connecting rod extends horizontally and rearwards from said control rod and said gear shift lever is connected to the frame and the connecting rod at locations one above the other.

* * * * *